United States Patent
McGrail et al.

(10) Patent No.: US 11,492,454 B2
(45) Date of Patent: Nov. 8, 2022

(54) HEATING OF POLYMERIC MATERIALS

(71) Applicant: UNIVERSITY OF LIMERICK, Limerick (IE)

(72) Inventors: Patrick Terence McGrail, Mickleby (GB); Dipa Roy, Limerick (IE); Ananda Roy, Limerick (IE); Richard Hanly, Shannon (IE); Walter Stanley, Limerick (IE)

(73) Assignee: UNIVERSITY OF LIMERICK, Limerick (IE)

(*) Notice: Subject to any disclaimer, the term of this patent is extended or adjusted under 35 U.S.C. 154(b) by 523 days.

(21) Appl. No.: 15/568,256

(22) PCT Filed: Apr. 21, 2016

(86) PCT No.: PCT/EP2016/058884
§ 371 (c)(1),
(2) Date: Oct. 20, 2017

(87) PCT Pub. No.: WO2016/170046
PCT Pub. Date: Oct. 27, 2016

(65) Prior Publication Data
US 2018/0148557 A1   May 31, 2018

(30) Foreign Application Priority Data

Apr. 22, 2015 (EP) ..................................... 15164680
Apr. 22, 2015 (EP) ..................................... 15164684

(51) Int. Cl.
*B29C 71/02* (2006.01)
*C08L 101/12* (2006.01)
(Continued)

(52) U.S. Cl.
CPC ................. *C08J 7/08* (2013.01); *C08J 5/046* (2013.01); *C08K 3/04* (2013.01); *C08L 27/06* (2013.01);
(Continued)

(58) Field of Classification Search
CPC ............... C08J 2367/02; C08J 2427/16; C08J 2475/04; C08J 2479/08; C08J 5/046
See application file for complete search history.

(56) References Cited

U.S. PATENT DOCUMENTS 4,141,879 A * 2/1979 McCarroll ............. C08K 13/04
524/196
5,290,821 A * 3/1994 Sakurai ................... C08K 3/04
521/82
(Continued)

FOREIGN PATENT DOCUMENTS

GB    2065138 A  *  6/1981    ............ C08L 101/00

OTHER PUBLICATIONS

International Search Report & Written Opinion for International Application No. PCT/EP2016/058884, dated Jul. 14, 2016, 10 pages.
(Continued)

*Primary Examiner* — Justin C Dodson
*Assistant Examiner* — Dilnessa B Belay
(74) *Attorney, Agent, or Firm* — Hoffman Warnick LLC

(57) ABSTRACT

A material susceptible to dielectric heating has a base polymeric thermoplastic material (1) and a dielectric heating susceptor (2, 3) which increases susceptibility to heating by irradiation with electromagnetic, for example RF or microwave, radiation. The dielectric heating susceptor has a polymeric material (2) such as PVDF which is different from the base polymeric material and has a higher dielectric loss factor than the base polymeric material. The dielectric
(Continued)

heating susceptor also comprises electrically polarisable entities such as carbon black dispersed within the base polymeric material without forming a conductive network. The two susceptor materials in combination with the base polymer are particularly effective together at improving susceptibility to electromagnetic radiation heating of the whole material.

15 Claims, 14 Drawing Sheets

(51) Int. Cl.
    *C08L 101/00* (2006.01)
    *C08L 67/02* (2006.01)
    *C08J 5/04* (2006.01)
    *C08K 3/04* (2006.01)
    *C08L 27/06* (2006.01)
    *C08L 67/03* (2006.01)
(52) U.S. Cl.
    CPC ............... *C08L 67/02* (2013.01); *C08L 67/03* (2013.01); *C08L 101/00* (2013.01); *C08L 101/12* (2013.01); *C08J 2367/02* (2013.01); *C08J 2427/16* (2013.01); *C08J 2475/04* (2013.01); *C08J 2479/08* (2013.01)

(56) References Cited

U.S. PATENT DOCUMENTS

| | | | |
|---|---|---|---|
| 5,338,611 A * | 8/1994 | Lause | B29C 66/7212 428/688 |
| 5,849,843 A * | 12/1998 | Laurin | C08L 23/02 525/66 |
| 5,854,347 A | 12/1998 | Laurin et al. | |
| 8,968,835 B2 * | 3/2015 | Akita | B29C 35/0805 427/508 |
| 2004/0078903 A1 * | 4/2004 | Bruning | D01F 8/14 8/181 |
| 2004/0129924 A1 * | 7/2004 | Stark | B29C 35/0272 252/500 |

OTHER PUBLICATIONS

Harper et al., "Use of Fillers to Enable the Microwave Processing of Polyethylene", Journal of Microwave Power & Electromagnetic Energy, vol. 40, No. 4 2007, 9 pages.

Del Rio et al., Extrinsic Conducting and Superconducting Polymer Systems-II. Effect of Copper and Carbon Black on the Compatibility and the Morphology of PVDF/PS Blends, European Polymer Journal vol. 31, No. 6, Jun. 1995, 7 pages.

Wu et al., "Carbon black-loading induced phase fluctuations in PVDF/PMMA miscible blends: dynamic percolation measurements", Polymer 42 (2001) 3271-3279.

* cited by examiner

Tri-layer tapes with RF susceptible sheath layers

Tri-layer tape composite after consolidation

HEATING OF POLYMERIC MATERIALS

INTRODUCTION

The invention relates to the heating of polymeric materials. More particularly, the invention relates to heating polymeric materials utilising electromagnetic radiation, such as Radio Frequency (RF) radiation, for example radiation having a frequency of for example in the range 10 MHz to 30 MHz, for purposes such as moulding, forming, flowing or curing or for any other purpose. The invention also relates to heating said polymeric materials utilising microwave radiation (MW) having a frequency of for example in the range 900 MHz to 2.45 GHz, for said purposes.

[1] describes the use of microwave irradiation to heat polymers containing components such as talc, zinc oxide and carbon black. For example, the carbon black proportion may be in the range of 5 to 30 percentage by weight (wt %).

[2] describes the heating of a combination of a polymer with an inorganic salt as a "dielectric heating promoter".

The invention is directed towards achieving improved heating of polymers by radio frequency or microwave frequency radiation.

REFERENCES

[1] "Use of Fillers to Enable the Microwave Processing Of Polyethylene", John Harper, Duncan Price and Jie Zhang, Journal of Microwave Power & Electromagnetic Energy, Vol. 40, No. 4, 2007

[2] GB2065138 (Polymer Laboratories).

SUMMARY OF THE INVENTION

A material susceptible to dielectric heating by electromagnetic radiation, the material comprising:
  a base polymeric material, and
  a dielectric heating susceptor comprising:
    polymeric material different from the base polymeric material and having a higher dielectric loss factor than the base polymeric material, and
    electrically polarisable entities dispersed within the base polymeric material.

The material may be susceptible to radio frequency heating. The material may be susceptible to microwave heating. The material may be susceptible to both radio frequency heating and microwave heating.

Suitably the dielectric heating susceptor is a material which is susceptible to dielectric heating. Suitably the dielectric heating susceptor is a material which can absorb electromagnetic radiation and convert said electromagnetic radiation to heat. Suitably the dielectric heating susceptor can absorb radio frequency radiation and/or microwave radiation and convert said radiation to heat. The dielectric heating susceptor may be an RF susceptor. The dielectric heating susceptor may be a microwave susceptor. The dielectric heating susceptor may be both an RF susceptor and a microwave susceptor.

Suitably the electrically polarisable entities are dispersed individually within the base polymeric material. Additionally or alternatively the electrically polarisable entities may be considered as discrete entities within the base polymeric material.

Suitably the electrically polarisable entities are capable of producing high interfacial polarisation loss, when dispersed within the base polymeric material.

The electrically polarisable entities may be electrically conductive entities. By electrically conductive entities we mean that the material from which the electrically conductive entities are formed is capable of conducting electricity, when present as a continuous bulk material for example. However, when present as the electrically polarisable entities of the present invention, the electrically conductive entities are suitably not capable of conducting electricity through the material of the present invention, as further described herein, due to the electrically conductive entities being present as discrete and/or dispersed entities not forming a continuous network.

In one embodiment, the base polymeric material is a thermoplastic polymer.

In one embodiment, the dielectric heating susceptor polymeric material is present in a proportion of 1 to 30 wt %, preferably 5 to 25 wt %.

In one embodiment, the electrically polarisable entities are present in a proportion of 0.1 to 10 wt %, preferably 0.5 wt % to 5 wt %.

In one embodiment, the dielectric heating susceptor polymeric material is present in the form of discrete phases in the base polymeric material, forming a multiple phase morphology.

Suitably the base polymeric material is a thermoplastic polymer or copolymer or blend.

Suitably the base polymeric material is a thermosetting polymer or copolymer or blend.

Suitably the base polymeric material is a blend of a thermosetting polymer with a thermoplastic polymer or copolymer.

Suitably the base polymeric material is selected from polyesters, polyolefins, polyphenylene sulfide, polyetherketones, polyethers, polyamides, polyetherimide, polyacrylonitrile, polystyrene, polyacrylates, polyethersulfones, polycarbonates, natural polymers, copolymers and blends/mixtures thereof.

Suitably the base polymeric material is selected from polyethylene terephthalates (PET), polyethylene (PE), polypropylene (PP), polyamides (PA), polyetheretherketone (PEEK), polyetherimide (PEI), polystyrene (PS and ABS), polyacrylates (e.g. PMMA), polycarbonate (PC), polyphenylene sulphide (PPS) or blends/mixtures thereof. In some embodiments, the base polymeric material may be a copolymer of one or more of these polymers.

Suitably the base polymeric material is selected from polyethylene terephthalate (PET), polyethylene (PE), polypropylene (PP), polyamides (PA), polyetheretherketone (PEEK), polyphenylene sulphide (PPS), polyetherimide (PEI), polystyrene (PS), acrylonitrile/butadiene/styrene (ABS), polyacrylates (e.g. PMMA), polyacrylonitrile (PAN), polycarbonate (PC) or blends/mixtures thereof.

Suitably the base material includes PET.

Suitably the base polymeric material is selected from but not restricted to epoxies, vinyl esters, unsaturated polyesters, phenolics, cyanate esters, bismaleimides, polyimides, and blends/mixtures thereof.

Suitably the base polymeric material is selected from but not restricted to blends of epoxies, vinyl esters, unsaturated polyesters, phenolics, cyanate esters, bismaleimides, polyimides, and blends/mixtures thereof with polyethersulphones, polycarbonates, polyetherimides, polyetherketones, polyesters, polyacrylics and blends/mixtures thereof.

Suitably the dielectric heating susceptor polymeric material is a polar polymer.

Suitably the base polymeric material is a thermoplastic polymer or copolymer and the polymeric material of the dielectric heating susceptor is a polar polymer.

Suitably the polymeric material of the dielectric heating susceptor is a polar polymer comprising one or a combination of polyvinylidine fluoride (PVDF), polyurethane (PU), and polyamide imide (PAI).

Suitably the dielectric heating susceptor is an RF susceptor and the polymer material of the RF susceptor is a polar polymer comprising one or a combination of PVDF, PU, and PAI.

In one embodiment, the base material is selected from polyethylene terephthalate (PET), polyethylene (PE), polypropylene (PP), polyamides (PA), polyetheretherketone (PEEK), polyetherimide (PEI), polystyrene (PS), polyacrylates (e.g. PMMA), polycarbonate (PC) or blends/mixtures thereof; and the dielectric heating susceptor is a polar polymer comprising one or a combination of PVDF, PU and PAI.

In one embodiment, the base material is selected from polyethylene terephthalate (PET), polyethylene (PE), polypropylene (PP), polyamides (PA), polyetheretherketone (PEEK), polyphenylene sulphide (PPS), polyetherimide (PEI), polystyrene (PS), acrylonitrile/butadiene/styrene (ABS), polyacrylates (e.g. PMMA), polyacrylonitrile (PAN), polycarbonate (PC) or blends/mixtures thereof; and the dielectric heating susceptor is a polar polymer comprising one or a combination of PVDF, PU and PAI.

In one embodiment, the base material is selected from polyethylene terephthalate (PET), polyethylene (PE), polypropylene (PP), polyamides (PA), polyetheretherketone (PEEK), polyphenylene sulphide (PPS), polyetherimide (PEI), polystyrene (PS), acrylonitrile/butadiene/styrene (ABS), polyacrylates (e.g. PMMA), polyacrylonitrile (PAN), polycarbonate (PC), epoxies, vinyl esters, unsaturated polyesters, phenolics, cyanate esters, bismaleimides, polyimides, and blends/mixtures thereof; and the dielectric heating susceptor is a polar polymer comprising one or a combination of PVDF, PU, PAI, PA, cellulose esters, PVC, acrylics, PVC/acrylic alloy.

In one embodiment, the base material includes PET and the dielectric heating susceptor polymer material is a polar polymer comprising one or a combination of PVDF, PU, and PAI.

The polymeric material of the dielectric heating susceptor may be additionally or alternatively selected from cellulose esters, polyamides (PA), polyvinyl chloride (PVC), acrylics, PVC/acrylic alloy.

In one embodiment, the electrically polarisable entities are present in the form of discrete entities (or units) not forming a conductive network. Suitably the material susceptible to dielectric heating of the present invention is not conductive, for example it does not conduct electricity through the material. In one embodiment, the size of the electrically polarisable entities is in the range of 10 nm to 100 μm. Suitably the electrically polarisable entities are particles having a size in the range of 10 nm to 100 μm.

In one embodiment, the electrically polarisable entities comprise carbon black.

Suitably the electrically polarisable entities have high interfacial polarisation loss properties.

In one embodiment, the electrically polarisable entities are of conductive material having interfacial polarisation loss properties.

In one embodiment, the base polymeric material is modified with an elastomer.

In one embodiment, the material further comprises a filler material to provide desired mechanical properties and/or flame-retardency and/or environmental resistance and/or chemical resistance, said filler material comprising particles and/or platelets and/or tubes and/or fibres to provide a composite material.

In a further aspect of the present invention, there is provided a material susceptible to dielectric heating by electromagnetic radiation, the material consisting essentially of:

a base polymeric material, and
a dielectric heating susceptor comprising:
polymeric material different from the base polymeric material and having a higher dielectric loss factor than the base polymeric material, and
electrically polarisable entities dispersed within the base polymeric material.

The material of this aspect may have any of the features described above.

In another aspect, the invention provides a process for heating a material as defined above in any embodiment, the process comprising irradiating the material with electromagnetic radiation until a desired temperature is achieved. In one embodiment, the electromagnetic radiation is RF radiation with a frequency in the range of 10 MHz to 30 MHz, and preferably in the range of 13.54 MHz to 27.12 MHz. In one embodiment, the electromagnetic radiation is MW radiation with a frequency in the range 900 MHz to 2.45 GHz.

DETAILED DESCRIPTION OF THE INVENTION

The invention will be more clearly understood from the following description of some embodiments thereof, given by way of example only with reference to the accompanying drawings in which:—

FIG. 1 is a schematic illustrating a base polymeric material containing discrete phases of a polar dielectric heating susceptor polymeric material and separate, discrete entities of an electrically polarisable material such as particles of certain grades of: carbon, polyaniline, polyaniline coated carbon black, polypyrrole coated carbon black, graphene, metals, metal coated polymers and other metallic entities etc. remaining dispersed in the base polymeric material. Suitably such materials are capable of producing high interfacial polarisation loss in response to an applied electric field;

Figure 1:
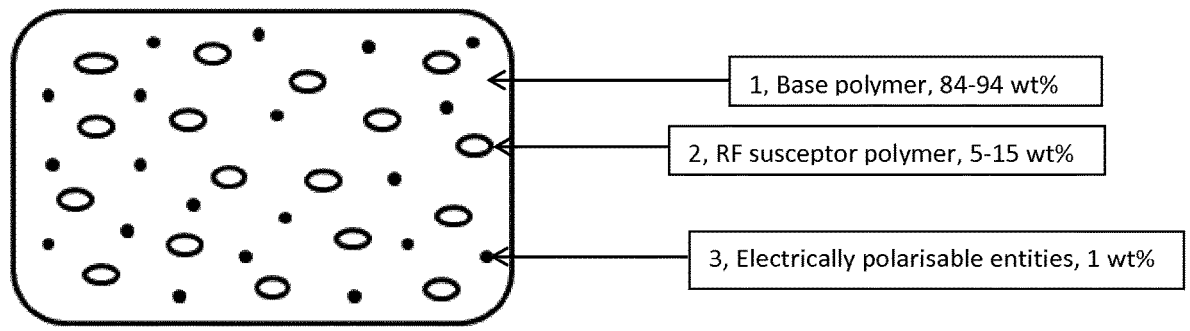

We describe polymeric materials which are susceptible to dielectric heating and methods of heating these materials.

Polymeric materials and processes for the heating of polymeric materials by dielectric heating are described. The polymeric materials comprise a base polymeric material and a dielectric heating susceptor. The dielectric heating susceptor comprises of a combination of i) a polymeric material, different from the base polymeric material, which has the ability to polarise in response to an applied electric field and has high dielectric loss properties, and ii) discrete electrically polarisable entities, which suitably have the capability of producing high interfacial polarisation loss in an applied electric field. Filler-type materials, including particles and/or fibres and/or platelets and/or tubes, may also be incorporated into the polymeric materials. The base polymeric material and the susceptor polymeric material preferably form an immiscible blend and the discrete electrically polarisable entities locate themselves preferentially in the base polymeric material phase. The susceptor polymeric material has a high dielectric loss factor and is responsive to an electromagnetic, for example an RF or microwave, field and provides high dielectric loss to the compounded material. High dielectric loss means higher ability of a material to dissipate a significant part of the applied electromagnetic energy in the form of heat. A material with high dielectric loss will thus heat up more in an electromagnetic field than a material with low dielectric loss. The presence of dispersed phases of such high dielectric loss materials in the base polymer will thus heat up the surrounding base polymer in an electromagnetic, for example an RF or microwave, field. The concentration of the discrete electrically polarisable entities is preferably kept at less than 5 wt % so that they can have a significant interfacial polarisation loss which adds to the overall dielectric loss of the material. Without being bound by theory, it is believed that the electrically polarisable entities (including electrically conductive entities), when present discretely in a polymeric matrix, and therefore separated by insulating layers of the polymer, undergo interfacial polarisation in an electromagnetic, for example an RF or microwave, field due to entrapment of the free charges between the polar/non-polar interfaces. The interfacial polarisation is caused by an enhancement in the motion of the trapped virtual charges at the interface of the components of the multiphase material of different polarity leading to a high interfacial polarisation loss. When an optimum combination of these two materials is incorporated in a base polymeric material as an electromagnetic, for example an RF or microwave, susceptor there is a surprising synergy between these two materials which results in a maximised heating effect in an electromagnetic, for example an RF or microwave, field which is significantly higher than that provided by either of these susceptors when used individually. Incorporating these susceptors in a base polymeric material can be achieved by any industrially viable route such as melt mixing, etc.

The base polymeric material and the susceptor polymeric material preferably form an immiscible blend and the electrically polarisable entities preferentially locate in the base polymeric material, remaining isolated from one another. These electrically polarisable entities may range in size and form. For example, particles or platelets from 10 nm to 100 µm in diameter and fibres or tubes from 10 nm to 10 mm in length are suitable and may be used either alone or in combination. However, such electrically polarisable entities are not limited to these forms and sizes and may be in any other physical form or size which is compatible with the polymeric materials and the blending process being used, and which satisfy the dispersibility and conductive requirements described herein.

The radiation to heat the material may be, for example, either RF radiation having a frequency preferably in the range 10 MHz to 30 MHz, and more preferably in the range of 13.54 MHz to 27.12 MHz, or may be, for example, MW radiation having a frequency in the range 900 MHz to 2.45 GHz.

The base polymeric material may be selected from a broad range of thermoplastic semi-crystalline or amorphous polymers such as polyethylene terephthalate (PET), polyethylene (PE), polypropylene (PP), polyamides (PA), polyetheretherketone (PEEK), polyetherimide (PEI), polystyrene (PS), polyacrylates (e.g. PMMA), polycarbonate (PC) etc. or blends of any such polymers. In addition, such susceptors can be incorporated into thermosetting resins to enable their heating and curing in an electromagnetic, for example an RF or microwave, field. Thermoset-thermoplastic resin blends can also be used as the base polymeric material. The base polymeric material may contain filler-type materials used in the trade such as particles and/or fibres to form composite materials. Such fillers may be used to enhance or otherwise modify mechanical and/or thermal properties and/or environmental resistance and/or fire resistance and/or to provide functionality and other special effects and/or to modify processability and/or to reduce cost.

The choice of the susceptor materials will vary depending on the base polymeric material and any filler-type materials incorporated into it.

The susceptors may be present in the base polymeric material where heating of the bulk is required or may be incorporated into a base polymeric material which forms an outer layer in a tri-layer tape or a sheath around a material which is not to be substantially heated, such as a fibre, for example, or in any other form where selective heating or melting is required. Different thermoplastic polymers such as PET, PE, PP, PA, PEEK, PPS, PEI, PS, ABS, PMMA, and PC, or blends thereof, or thermosetting resins such as epoxies, vinyl esters, unsaturated polyesters, phenolics, cyanate esters, bismaleimides or blends thereof, or thermoset/thermoplastic blends can be made dielectric heating susceptible by the incorporation of suitable susceptors.

In more detail, the dielectric heating susceptor includes at least:

i) A susceptor polymer. This may be a polar polymeric material with high dielectric loss factor (DLF) such as PVDF, a PU, a PAI, PA, cellulose esters, PVC, acrylics, PVC/acrylic alloy suitably in 1-30 wt % ratio with the base polymeric material. The susceptor polymeric material is preferably immiscible with the base polymeric material and together they preferably form a two-phase morphology. The susceptor polymeric material preferably exhibits high dipolar loss in an electromagnetic, for example an RF or microwave, field and increases the overall dielectric loss of the material.

ii) Entities of an electrically polarisable material (used at 0.1 to 10 wt %). These polarisable entities remain dispersed in the base polymeric material, in other words as individual units, and their concentration is such that it is not adequate to form a conductive network throughout the material, yet they have an interfacial polarisation loss in an electromagnetic, for example an RF or microwave, field which adds to the overall dielectric loss of the material.

The susceptor components can be incorporated into the base polymeric material by any industrially viable process. The dielectric heating susceptor is formulated in such a way that minimum amounts of the component materials are required to attain high dielectric loss leading to a significant amount of heating in an electromagnetic, for example an RF or microwave, field in a significantly shorter period of time compared to the unmodified base material. Minimum concentration of the susceptor components in the base polymeric material is desirable in order to have minimal effect on the base polymeric material properties.

The selection of the base polymeric material (suitably 70-99 wt %) and the susceptor polymeric material (suitably 1-30 wt %) is done in such a way that they are immiscible. The polarisable entities preferentially remain dispersed in the base polymeric material. The susceptor polymeric material (1 to 30 wt %) forms discrete phases in the base polymeric material to produce a morphology which may be of the particulate or so-called sea-island type and the polarisable entities reside individually in the base polymer phase without forming any percolating or conducting network, for example a continuous network of such entities throughout the material which would be able to conduct electricity through the material if the polarisable entities are conductive. This is shown schematically in FIG. 1 where a base polymeric material (1) contains a discrete phase (2) of the susceptor polymeric material and the polarisable entities (3) remain dispersed in the base polymeric material without forming any continuous and/or conductive network.

For dielectric heating, the material dielectric property of interest is the dielectric loss factor or DLF ($\varepsilon''$), which principally determines the amount of energy absorbed by the material for a given electric field. This absorption of electrical energy eventually manifests itself as heat and the higher the DLF the more heat is generated in the material in an electric field. Dielectric loss results from the inability of the polarization process in a polar molecule to follow the rate of change of the oscillating applied electric field. This is related to the relaxation time of a polymer, which is the time taken for the dipoles to return to their original random orientation. It does not occur instantaneously but the polarization diminishes exponentially. If the relaxation time is smaller or comparable to the oscillating rate of the electric field then there is either no loss or minimum loss. However, when the electric field oscillates faster than the relaxation time the polarization cannot follow the oscillating frequency and this results in energy absorption and its dissipation as heat. There is no dipole polarization contribution for non-polar polymers, hence non-polar polymers have a low DLF and do not heat rapidly in an electric field. In addition to dipolar loss in an electric field there is also interfacial polarisation loss which originates from an excessively polarised interface between dispersed polarisable entities and the base polymeric material. Dipolar loss and interfacial polarisation loss are the two major mechanisms which contribute to the overall dielectric loss of a material. A polar polymer like polyvinylidene difluoride (PVDF) has a high dipolar loss and electrically polarisable materials such as some grades of carbon black exhibit high interfacial polarisation loss. Dipolar loss and interfacial polarisation loss effects have been maximised here by the selection of a suitable combination of susceptor material components to produce a synergistic effect.

One example of a base polymeric material is polyethylene terephthalate (PET). A broad range of compositions were studied to optimise the formulation including different susceptor polymers and different polarisable entities. The base polymer content was varied between 67 to 94 wt % and the susceptor polymer was varied between 5 to 30 wt %. The polarisable material content was varied between 0 and 3 wt %. A dielectric heating susceptor formulation which has been evaluated with PET is a combination of functionalised PVDF (Kynar® ADX 111 from Arkema with a measured DLF above 0.08 at 27.12 MHz at room temperature) used at 5 to 15 wt % with polarisable entities comprising particles of a suitable grade of carbon black (CB) (Black Pearl® 2000 from Cabot Corporation) used at 1 to 3 wt %. This grade of CB is a furnace process carbon black designed for critical applications and is capable of undergoing high interfacial polarisation loss in an electric field. It has good physical properties, making it suitable for compounding with polymeric materials and a highly aggregated structure comprising very fine (12 nm) individual carbon particles of high surface area (1487 $m^2$ $g^{-1}$). The CB contributes to the interfacial polarisation loss and an overall increase in the dielectric loss of the whole material. The grade of PVDF used here contains functional groups which impart strong interfacial properties with the base polymer.

The compositions of some of the materials based on PET and utilising the PVDF and CB grades described above and which were tested for RF heating are as follows:

TABLE 1

Polymer blend compositions (PET-PVDF-CB) designed to develop RF susceptible formulation

| Base polymer PET (wt %) | RF Susceptor | |
|---|---|---|
| | PVDF (wt %) | Carbon black (wt %) |
| 100 | 0 | 0 |
| 99 | 0 | 1 |
| 97 | 0 | 3 |
| 95 | 5 | 0 |
| 94 | 5 | 1 |
| 92 | 5 | 3 |
| 85 | 15 | 0 |
| 84 | 15 | 1 |
| 82 | 15 | 3 |
| 70 | 30 | 0 |
| 69 | 30 | 1 |
| 67 | 30 | 3 |

Dielectric Measurement

TABLE 2 shows the DLF for all the compositions measured at room temperature at 27.12 MHz frequency using an HP 4917 Impedance Gain Analyser. It will be seen from this table that the DLF values are particularly high where the CB proportion is at 3 wt %.

TABLE 2

DLF values of the blend compositions at 27.12 MHz frequency at room temperature.

| Composition | | | |
|---|---|---|---|
| PET (wt %) | PVDF (wt %) | CB (wt %) | DLF at 27.12 MHz frequency |
| 100 | 0 | 0 | 0.03501 |
| 99 | 0 | 1 | 0.04748 |
| 95 | 5 | 0 | 0.04430 |
| 94 | 5 | 1 | 0.05392 |
| 92 | 5 | 3 | 0.35197 |
| 85 | 15 | 0 | 0.03193 |
| 84 | 15 | 1 | 0.04896 |
| 82 | 15 | 3 | 0.44501 |
| 70 | 30 | 0 | 0.04367 |
| 69 | 30 | 1 | 0.04628 |
| 67 | 30 | 3 | 0.44793 |

RF Heating

The blend compositions were tested for their heating ability in an RF press using a pressure of 450 kPa. Test blocks (50 mm×20 mm×10 mm) were manufactured by extrusion and compression moulding. Table 3 shows the RF heating test parameters.

TABLE 3

RF heating test parameters

| | RF Power (kW)-Time (sec) |
|---|---|
| Set I | 0.00 kW-5 sec |
| | 0.20 kW-10 sec |
| | 0.35 kW-30 sec |
| Set II | 0.00 kW-5 sec |
| | 0.20 kW-10 sec |
| | 0.35 kW-60 sec |
| Set III | 0.00 kW-5 sec |
| | 0.20 kW-10 sec |
| | 0.45 kW-30 sec |
| Set IV | 0.00 kW-5 sec |
| | 0.20 kW-10 sec |
| | 0.45 kW-60 sec |

The RF heating results of the (PET-PVDF) blends are given in Table 4.

TABLE 4

Effect of PVDF on RF heating of PET, values are the highest temperature achieved (in ° C.) measured by an IR thermometer.

| PET-PVDF-CB | Highest Temperature (° C.) | | | |
|---|---|---|---|---|
| Blend Compositions | 0.35 kW-30 sec | 0.35 kW-60 sec | 0.45 kW-30 sec | 0.45 kW-60 sec |
| 100-0-0 | 31.0 | 49.0 | 39.0 | 61.0 |
| 95-5-0 | 48.0 | 70.0 | 57.0 | 74.0 |
| 85-15-0 | 60.0 | 94.0 | 76.0 | 90.0 |
| 70-30-0 | 82.0 | 104.0 | 85.0 | 99.0 |

Figure 2:
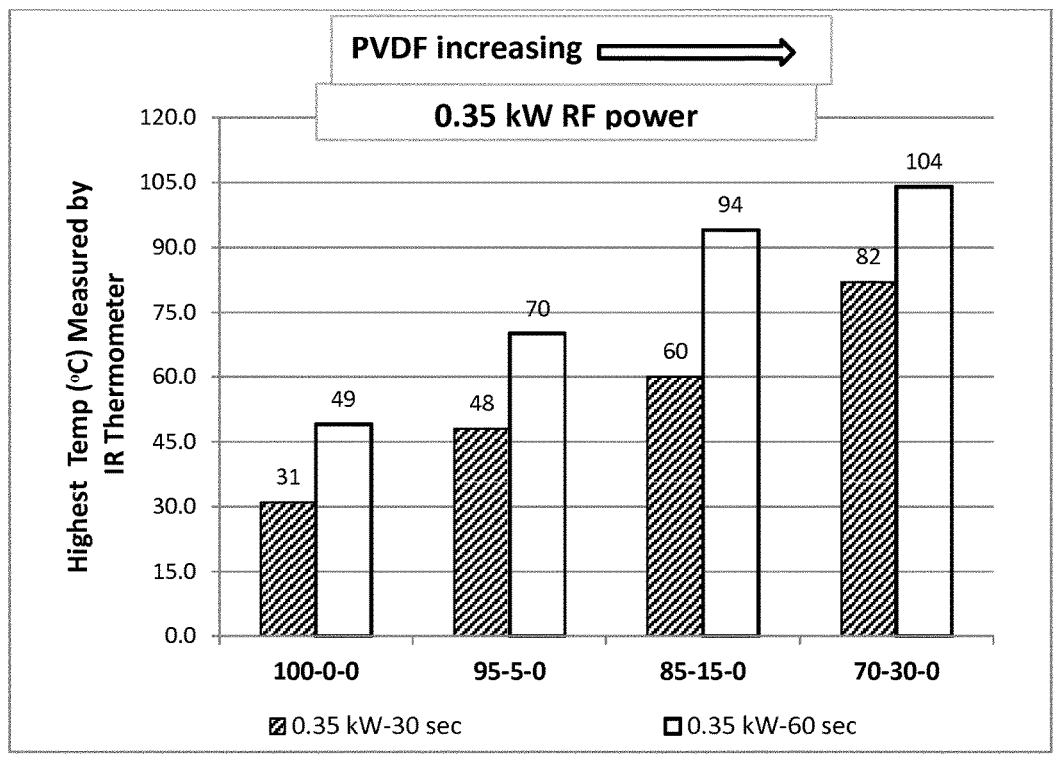
FIGS. 2 to 4 are plots showing compositions and heating performance values.
Figure 3:
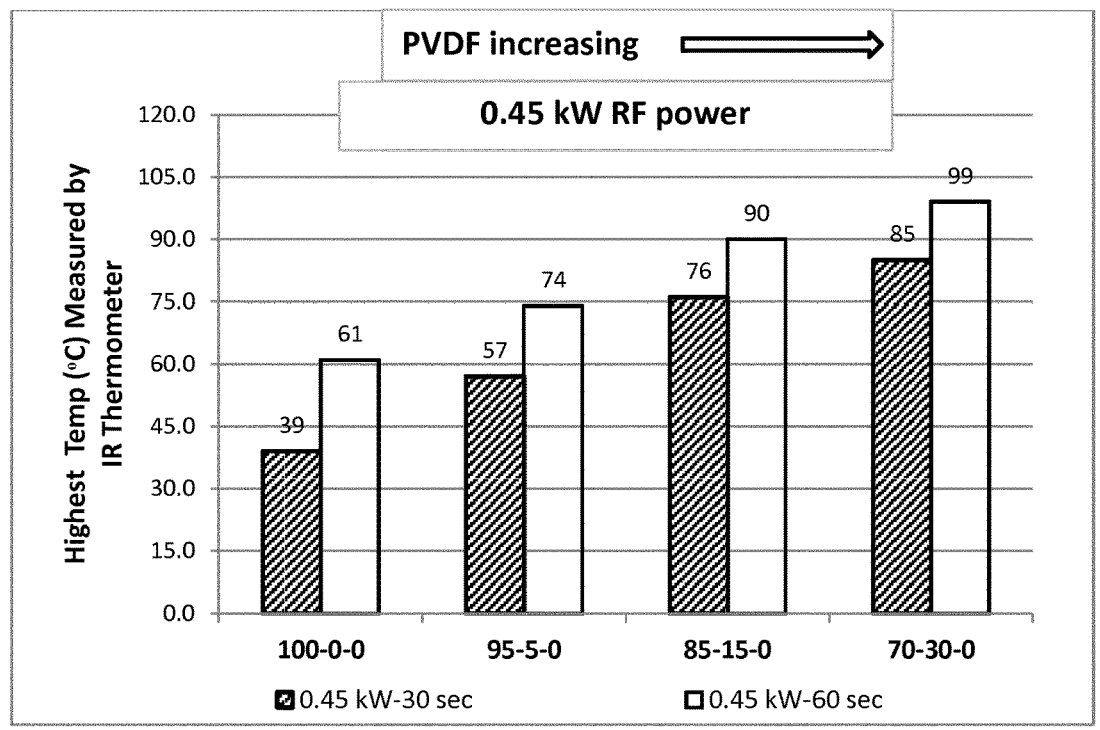

The results are also shown in FIGS. 2 and 3. The effects of increasing PVDF content in the blends are shown in FIGS. 2 and 3 at two different RF power levels and times. These plots show the temperature rise in PET with different PVDF contents at two different RF power levels (0.35 kW and 0.45 kW) and two different times (30 sec and 60 sec). The vertical axes of these plots are the highest temperatures attained by the test samples in the RF field as measured by an IR thermometer.

The effect of combination of (PVDF-CB) susceptor on the RF heating is given in Table 5.

TABLE 5

Effect of the combination of (PVDF-CB) on the RF heating of PET, values are the highest temperature achieved (in ° C.) measured by an IR thermometer

| PET-PVDF-CB Blend Compositions | 0.35 kW-30 sec | 0.35 kW-60 sec | 0.45 kW-30 sec | 0.45 kW-60 sec |
|---|---|---|---|---|
| 100-0-0 | 31.0 | 49.0 | 39.0 | 61.0 |
| 99-0-1 | 46.0 | 63.0 | 56.0 | 75.0 |
| 95-5-0 | 42.0 | 60.0 | 58.0 | 49.0 |
| 94-5-1 | 96.0 | 117.0 | 115.0 | 127.0 |
| 92-5-3 | 113.0 | arcing | arcing | arcing |
| 85-15-0 | 53.0 | 88.0 | 69.0 | 71.0 |
| 84-15-1 | 76.0 | 109.0 | 102.0 | 100.0 |
| 82-15-3 | 111.0 | arcing | arcing | arcing |
| 70-30-0 | 60.0 | 95.0 | 76.0 | 94.0 |
| 69-30-1 | 85.0 | 105.0 | 90.0 | 102.0 |
| 67-30-3 | 125.0 | arcing | arcing | arcing |

Figure 4A:
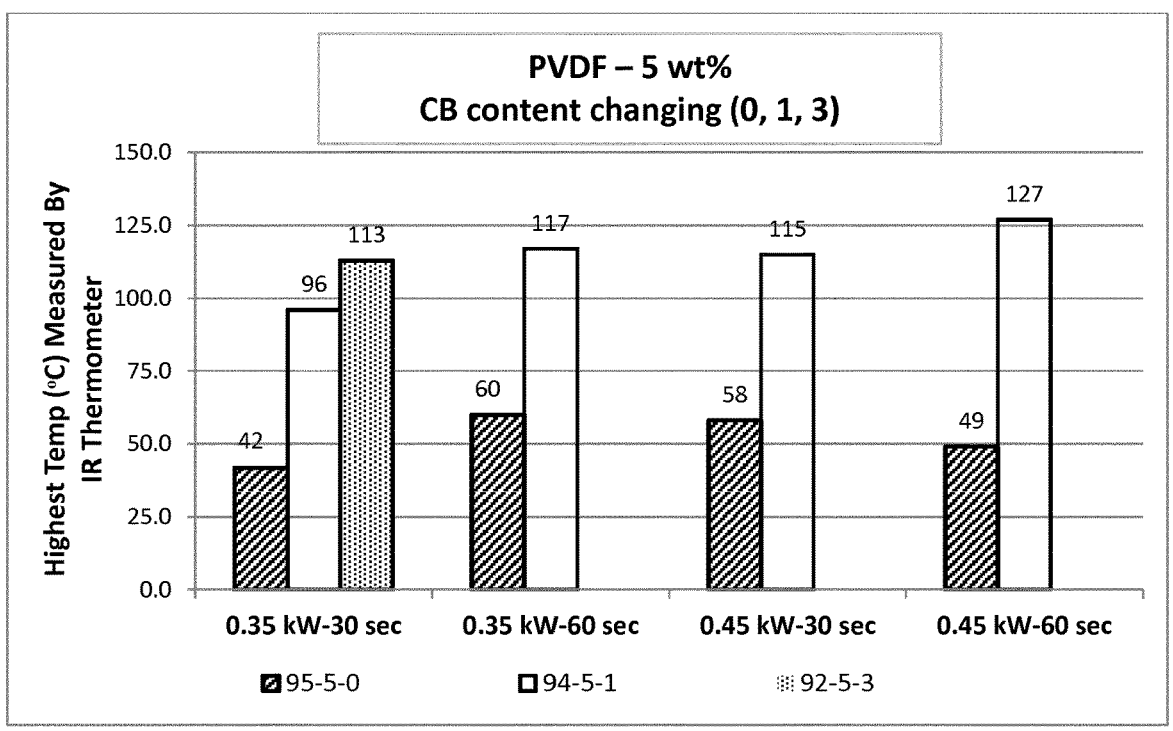
Figure 4B:
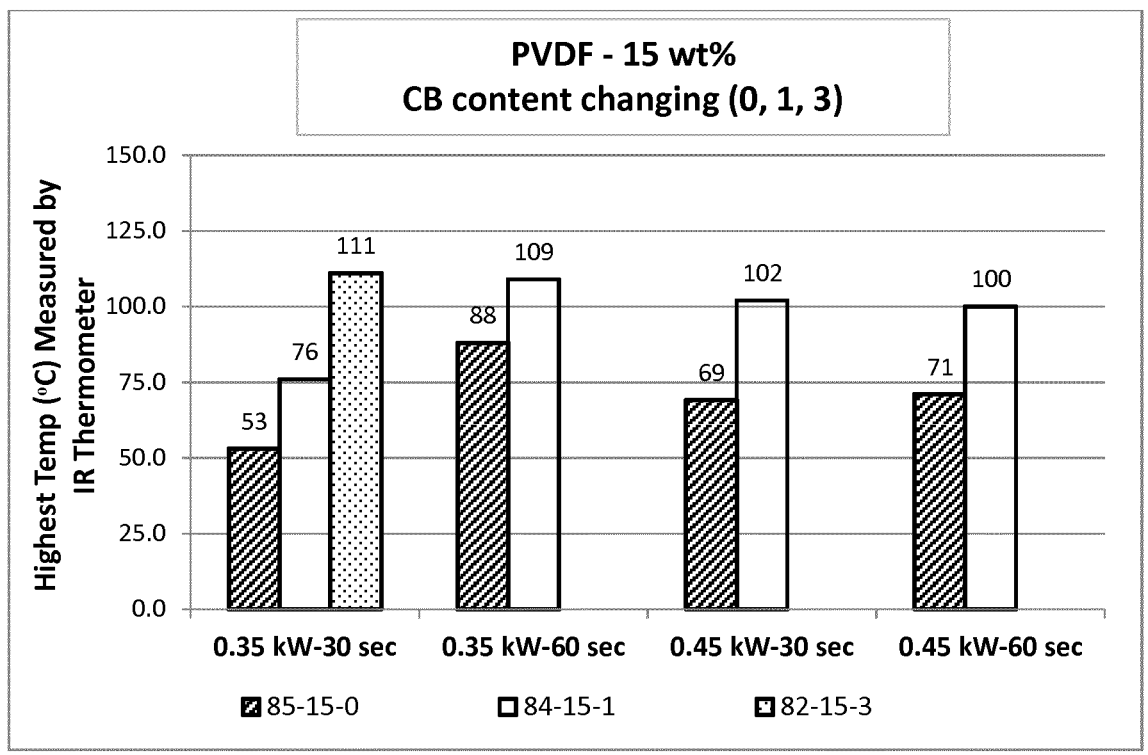
Figure 4C:
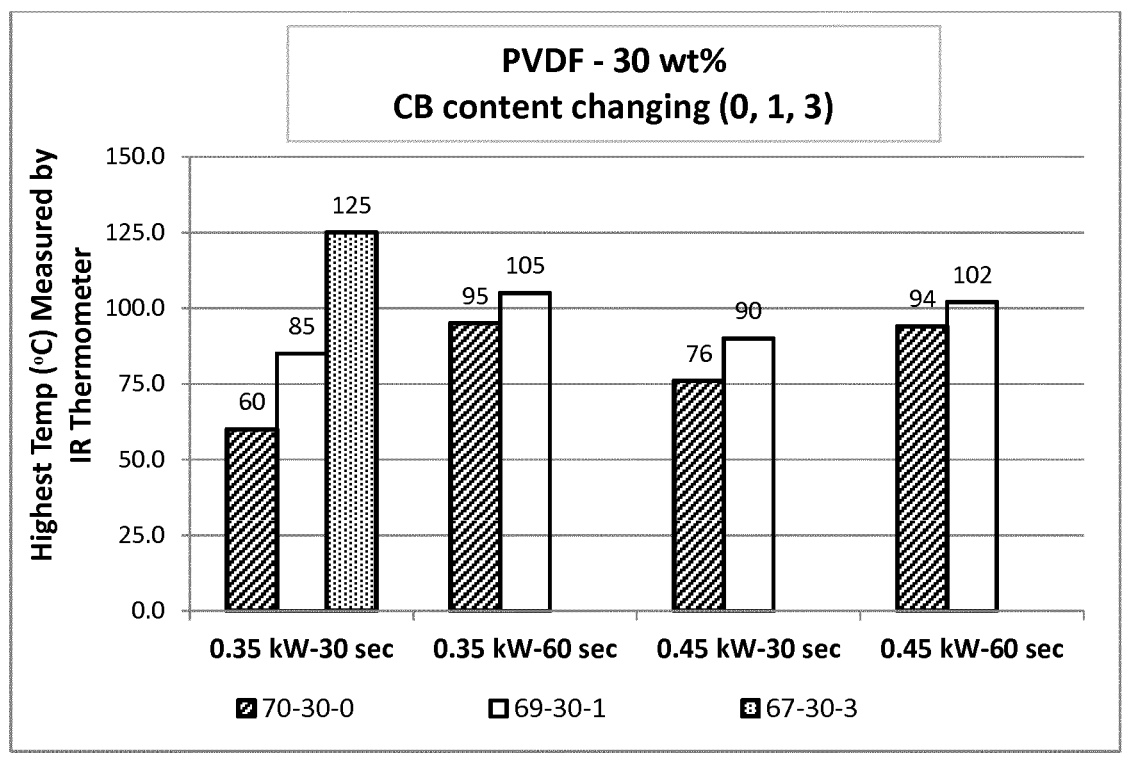

The results are also shown in FIGS. 4a, b and c. FIG. 4 shows the temperature rise in PET-PVDF blend compositions with different CB contents at two different RF power levels (0.35 kW and 0.45 kW) and times (30 sec and 60 sec). The samples with 3 wt % CB showed arcing and could not be tested.

Morphology

Figure 5:
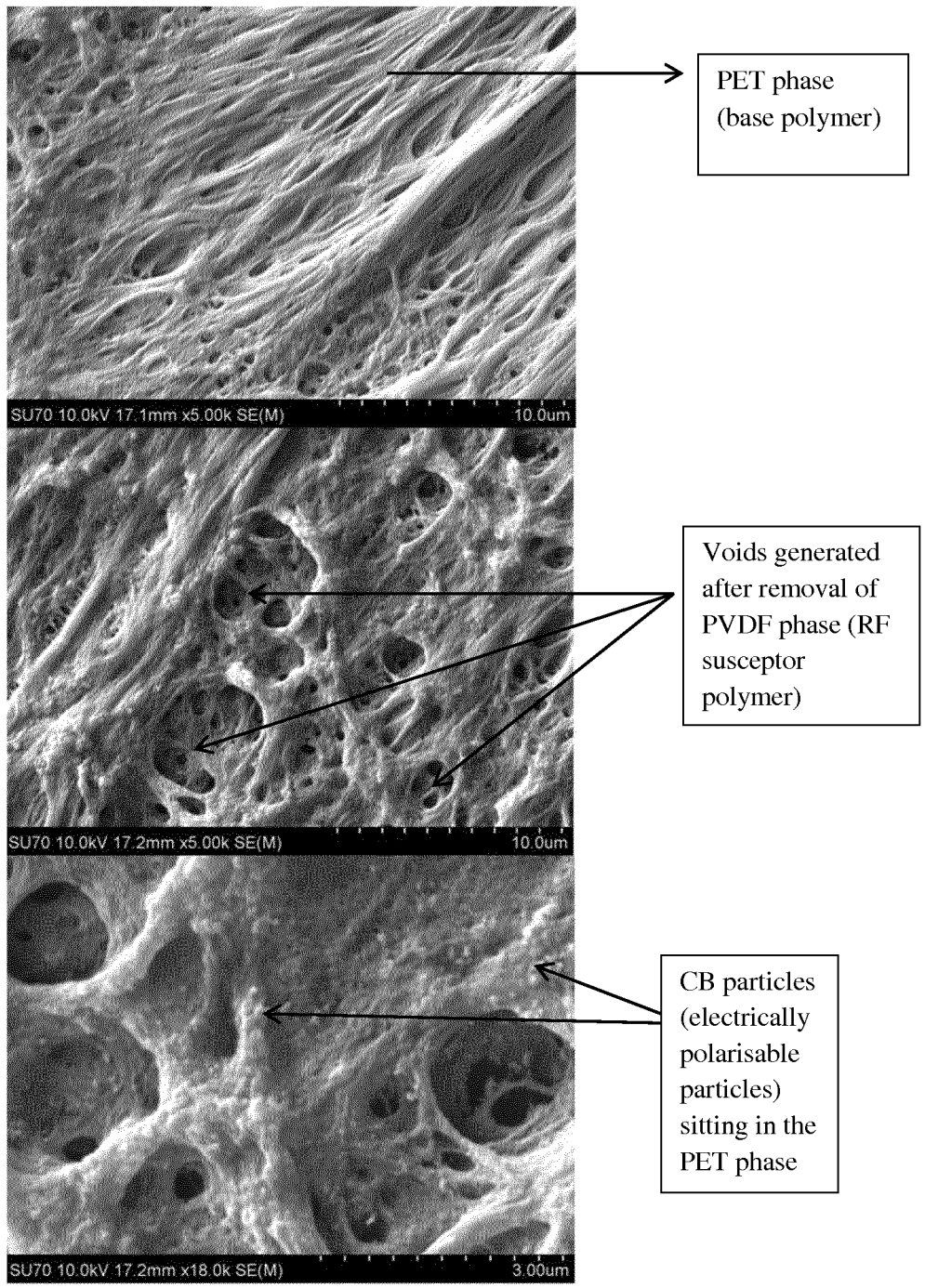
FIG. 5 is a set of images showing the material phases.

The morphology of a test sample with the composition PET-PVDF-CB 84-15-1 was determined using SEM (Scanning Electron Microscopy). The sample was prepared for SEM analysis by removing the PVDF fraction using solvent extraction with dimethylacetamide. In FIG. 5 micrographs from this SEM analysis show the presence of dispersed CB particles in the PET phase.

DoE Analysis

Figure 6:
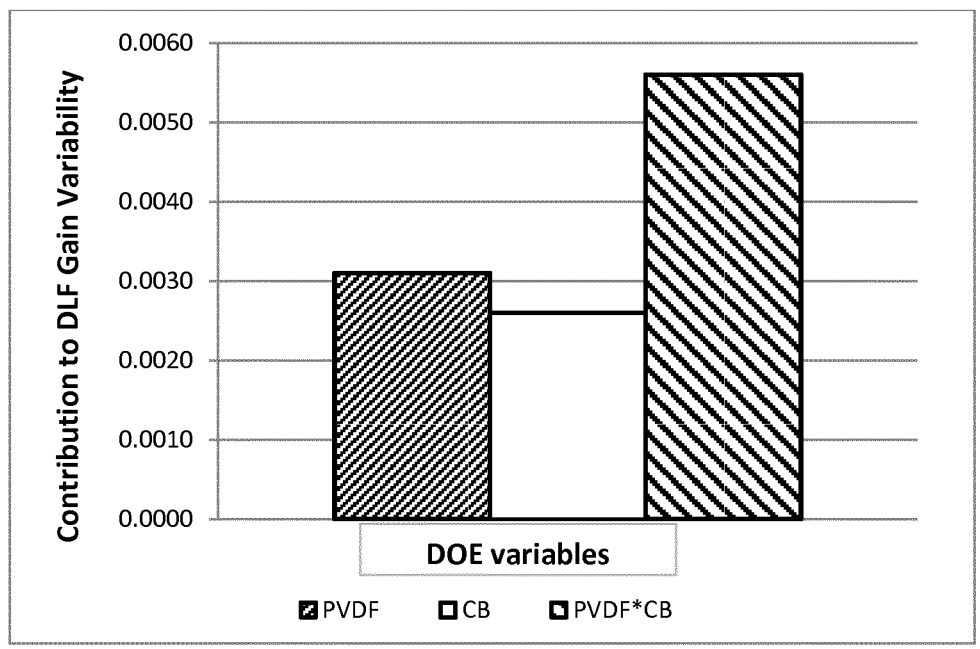
FIGS. 6 to 11 are further plots showing measured values for tests.

Design of Experiments (DoE) were employed to gather information on the interactions between the elements in the design (PVDF and CB content) and how these interactions affected the variation in the output measure (DLF). FIG. 6 shows the contribution of the individual PVDF and CB components compared with the combined PVDF and CB interactions in the material, which has significant influence on the DLF of the material in an applied electric field at room temperature at 27.12 MHz frequency. The variables along the X axis of these plots are the components PVDF and CB used in the formulation, either taken individually or in combination. The Y axis shows the contribution of the components, individually or in combination, to the DLF gain variability of the material.

FIG. 6 shows the contribution of the individual and combined PVDF and CB contents on the DLF of the material. The graph clearly indicates that the combined interaction of the PVDF and CB components has a more pronounced effect on the DLF value of the material than the individual contribution of each component.

Figure 7:
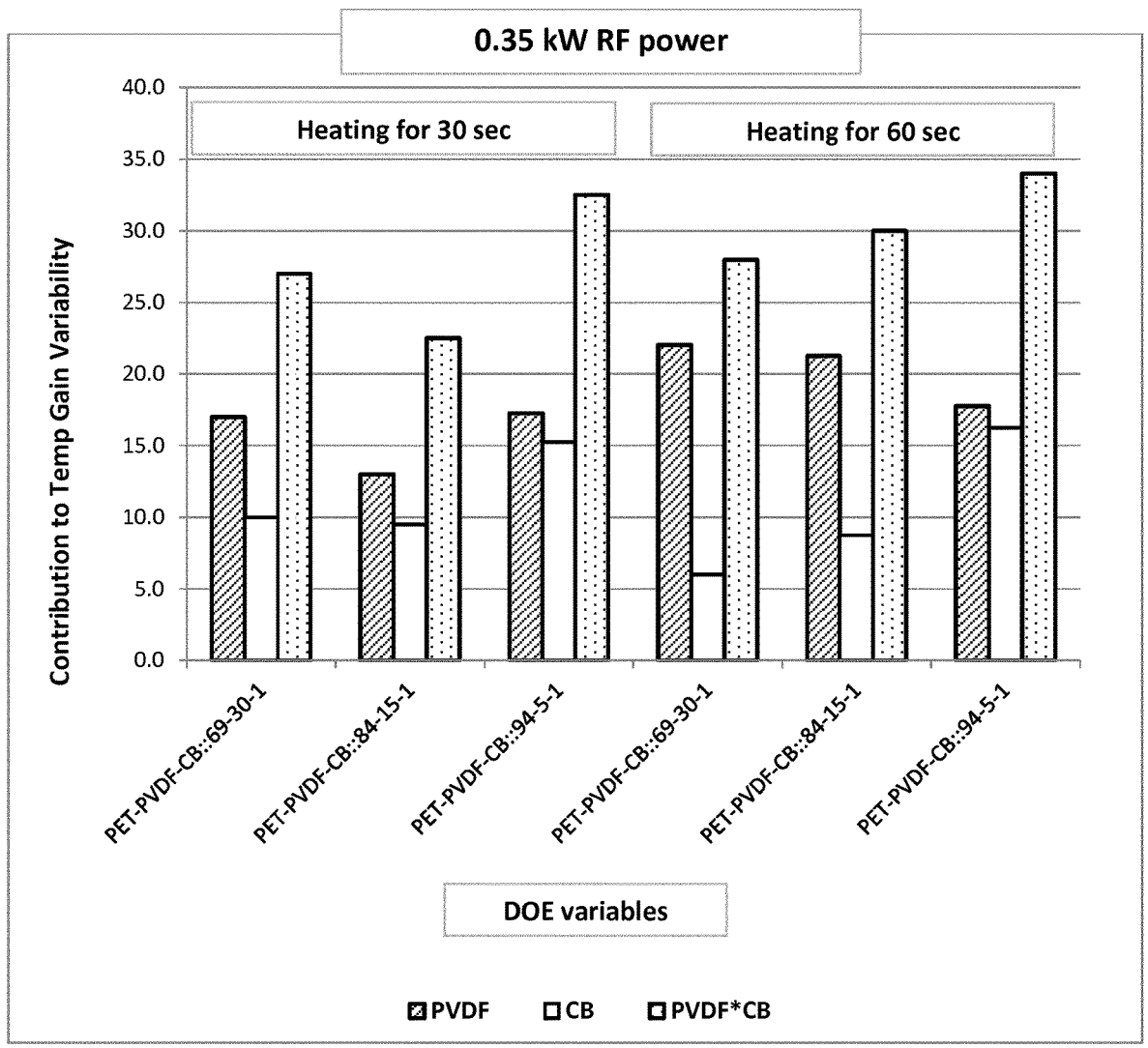
Figure 8:
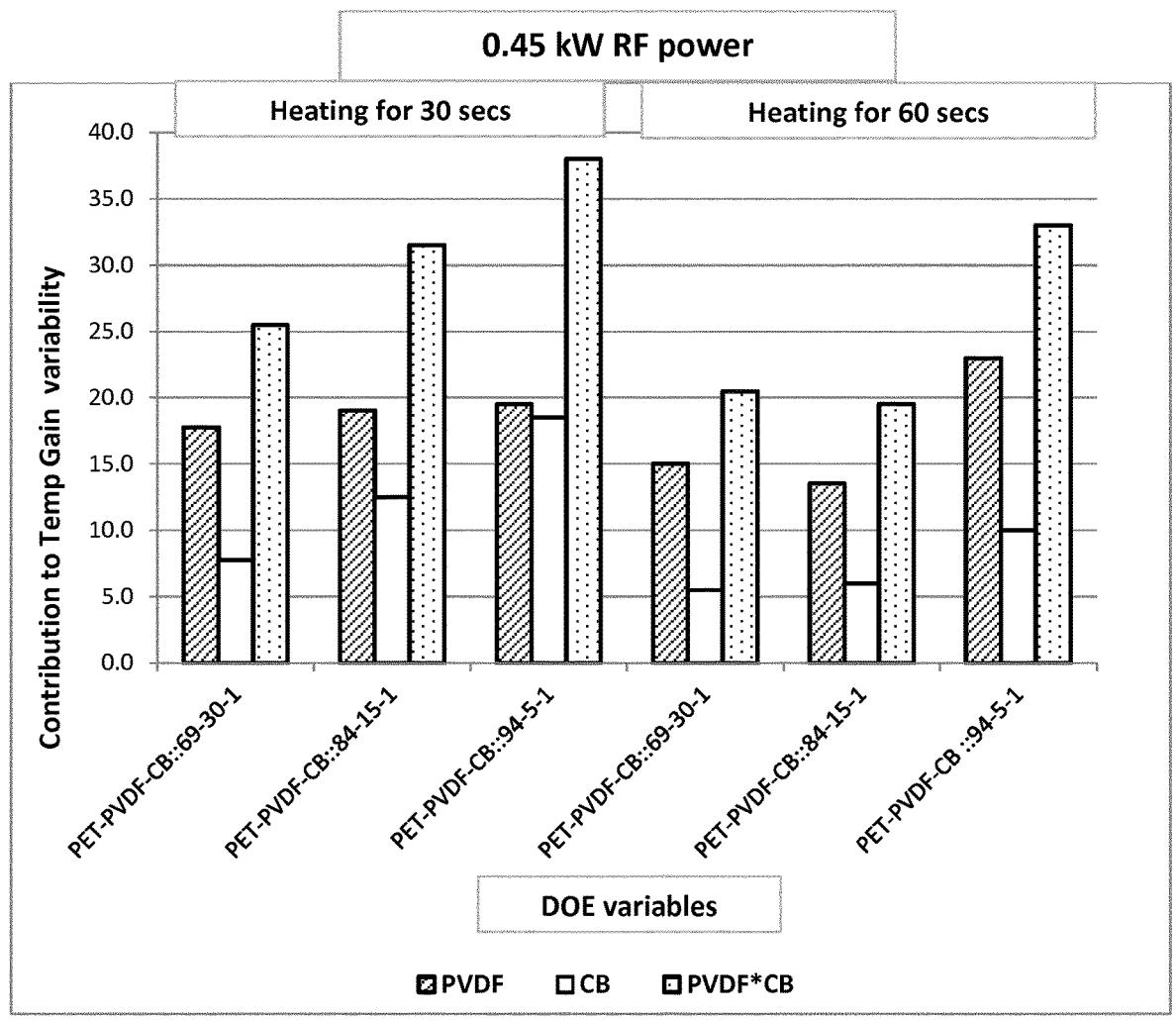

Design of Experiments (DoE) was also employed to gather information on the interactions between the PVDF and CB content in the design and how these interactions influenced the variation in the output measure (temperature rise in the RF field). FIGS. 7 and 8 show the contribution of the individual and combined interactions in raising the temperature of the material under RF field. The variables along the X axes of these plots are the amounts of PVDF and CB used in the formulation, either taken individually or in combination. The Y axes represent the contribution of the components, individually or in combination, to the temperature gain variability of the material in the RF field.

FIG. 7 shows the contribution of the individual and combined PVDF and CB interactions on the temperature gain variability of the material in the RF field at 0.35 kW RF power.

FIG. 8 shows the contribution of the individual and combined PVDF and CB interactions on the temperature gain variability of the material at 0.45 kW RF power.

The contribution of the combined interactions of PVDF and CB were found to be predominant across all formulations and for all RF test parameters (0.35 kW and 0.45 kW power levels and 30 sec and 60 sec times).

Thermal Imaging

The RF heating ability of the different blend compositions were also tested with a thermal imaging camera. The tests were done for 60 sec at two power levels, 0.35 kW and 0.45 kW.

Figure 9:
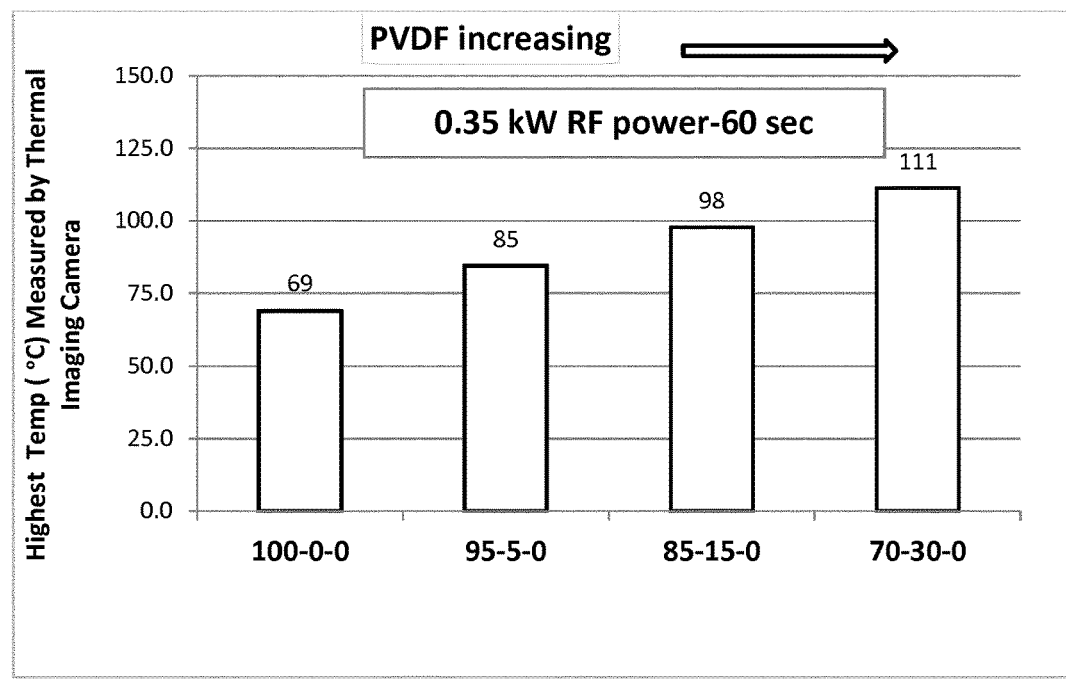
Figure 10:
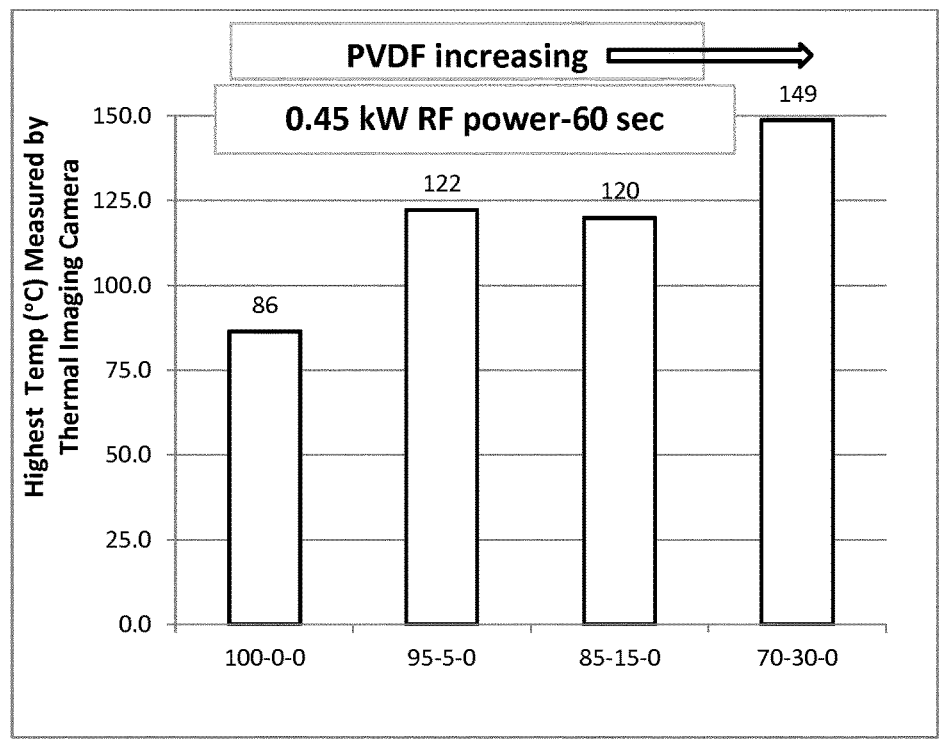

The highest temperatures measured by the thermal imaging camera are plotted in FIGS. 9 and 10. FIGS. 9 and 10 show the temperature rise in the material with increase in PVDF content (0-30 wt %) at two different RF power levels of 0.35 kW and 0.45 kW respectively for 60 sec.

Figure 11A:
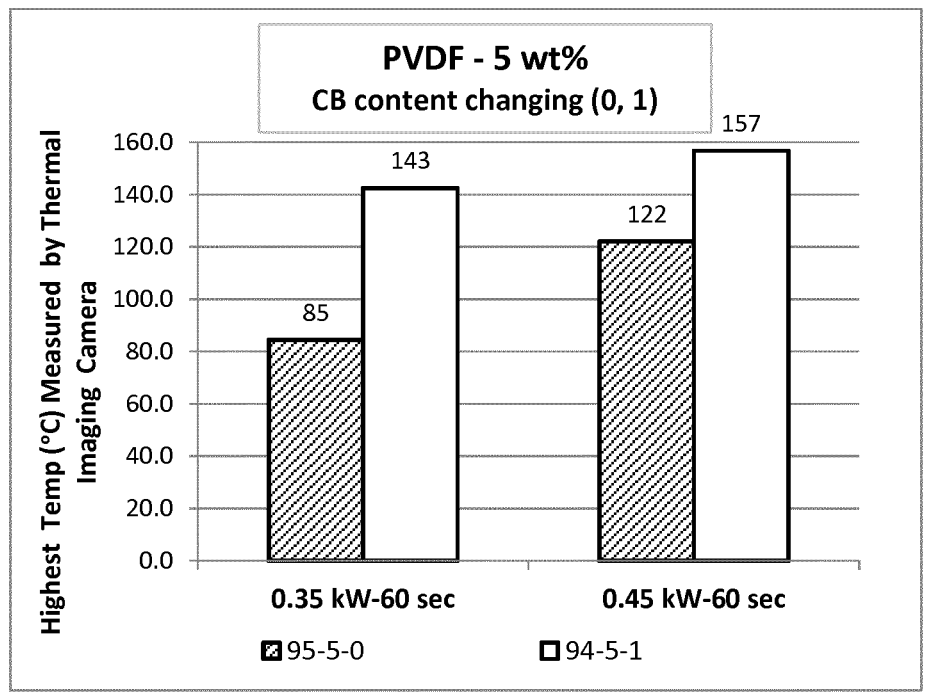
Figure 11B:
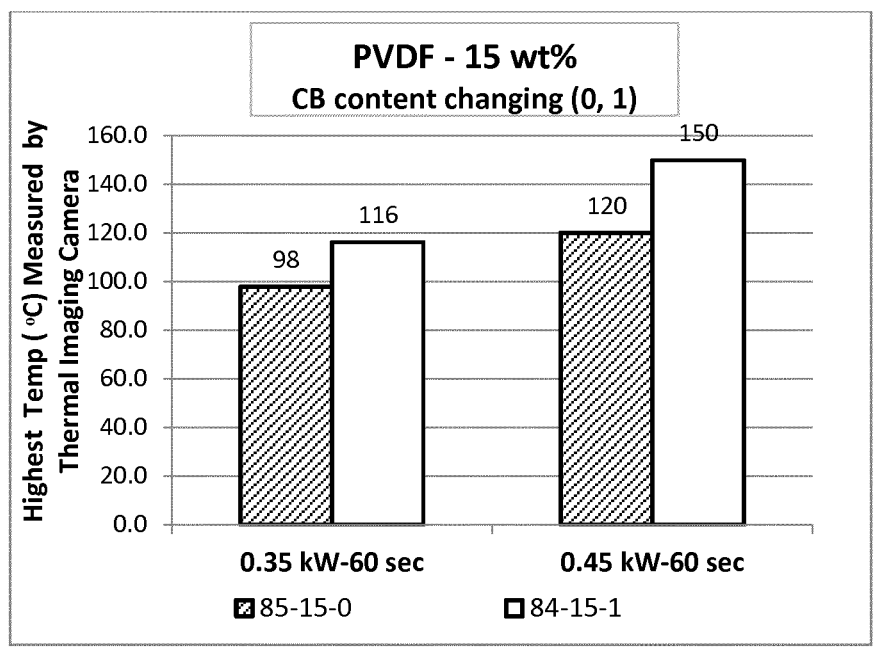
Figure 11C:
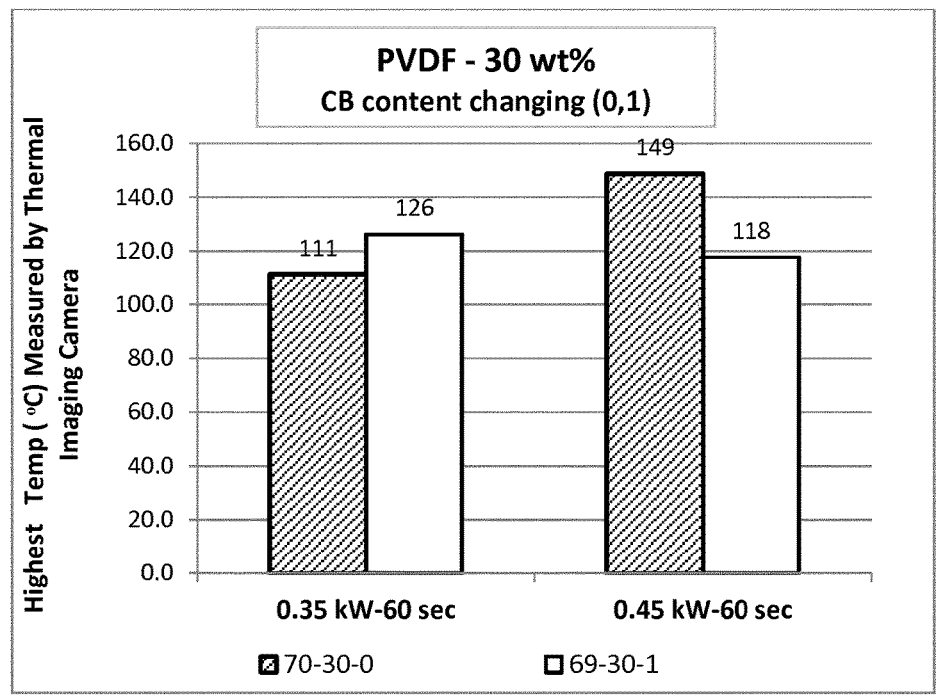

FIG. 11 shows the temperature rise in PET-PVDF blend compositions with different CB contents when tested in RF field at (a) 0.35 kW (b) 0.45 kW power levels for 60 sec.

In general terms the preferred ranges of proportions of the components for the RF susceptible formulation in this example are PET (84-94 wt %), PVDF (5-15 wt %) and CB (1 wt %).

In one example, a PET-PVDF-CB composition of 84-15-1 was selected for making a core:sheath type bicomponent fibre. This RF susceptible formulation formed the sheath of the coaxial fibres to render the sheath RF susceptible whilst the core was made of pure PET. The material was thus designed to melt selectively in the sheath layer with no melting of the core occurring during processing.

Figure 12:
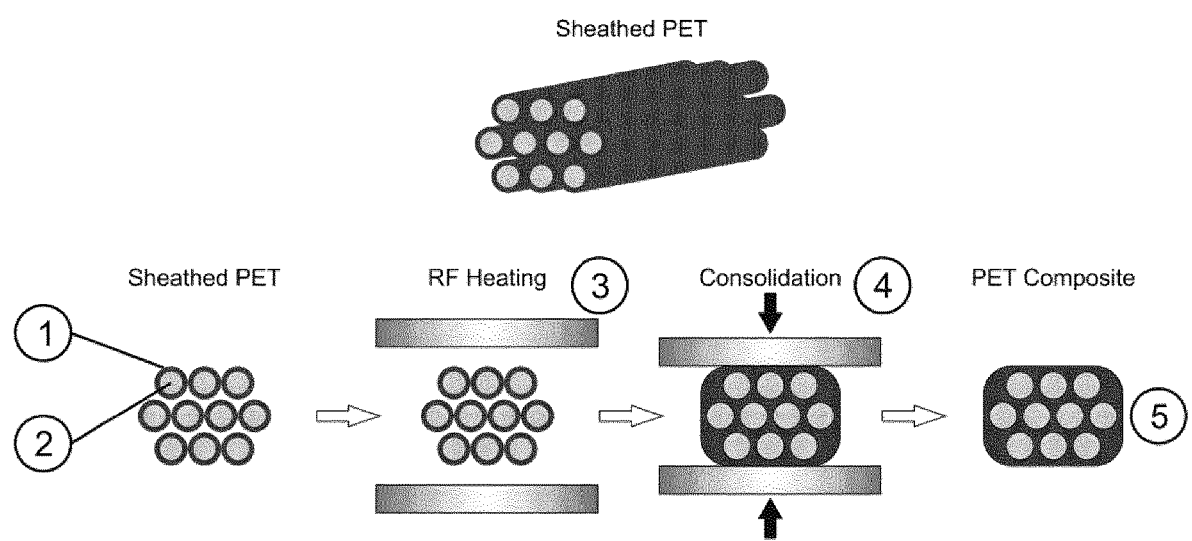
FIG. 12 is a diagram showing heating and pressing of a dielectric heating susceptible material as sheaths around non-heating cores in fibres.

FIG. 12 shows schematically a core/sheath type bi-component fibre with an RF susceptible sheath layer (11) around a continuous fibre core (12). Only the sheath layer heats in an RF field and so melts to form a composite. On RF heating (13) and pressing (14) a consolidated composite (15) is produced.

Figure 13:
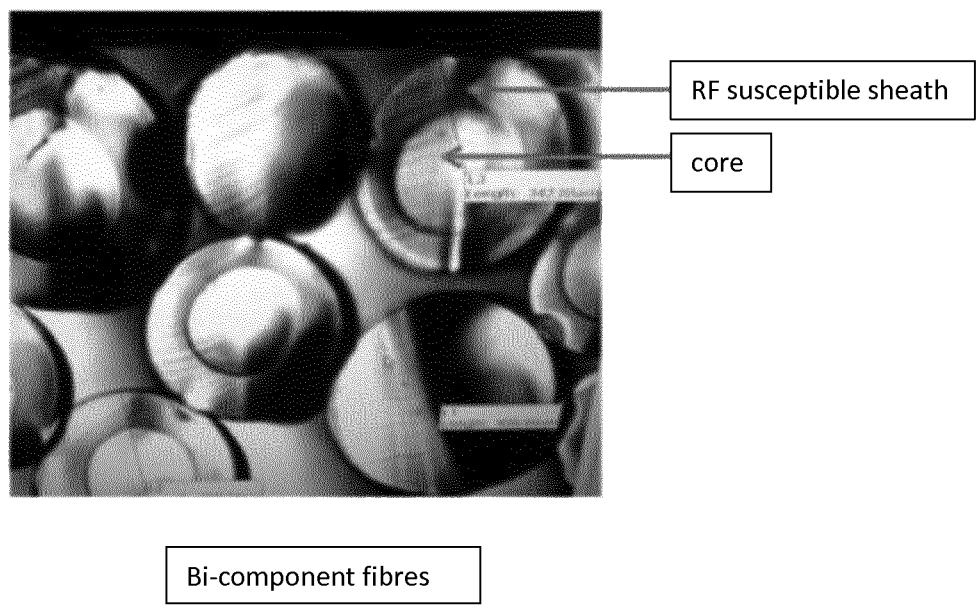
FIG. 13 is an image showing fibre cross sections with dielectric heating susceptible sheath around cores.

FIG. 13 shows the cross section of actual core:sheath bi-component fibres. Such fibres were woven into fabric and layers of this fabric were placed in an RF press and consolidated by pressure. During this process the RF susceptible sheath layer of the bi-component fibres melted to form a matrix leaving the core fibres unaffected to act as the reinforcement of the resulting "self-reinforced" composite. In this example the materials used were:

Core material: PET with intrinsic viscosity (IV) ranging from 0.65-0.80

Sheath material: PET with IV ranging from 0.65-0.8; PVDF (Kynar® ADX 111 grade from Arkema) and carbon black (Black Pearl® 2000 from Cabot Corporation). The composition is given in Table 6.

TABLE 6

Composition of co-axial fibre

|  | PET (wt %) | PVDF (wt %) | Carbon black (wt %) |
|---|---|---|---|
| RF susceptible sheath | 84.0 | 15.0 | 1.0 |
| Core | 100.0 | — | — |

Fibre diameter (core+sheath):
 Unstretched: ~350 μm
 Core diameter: ~220 μm
 Sheath thickness: ~65 μm The specification range may change depending on the desired ratio of matrix and reinforcement. Fibres, after melt spinning, were subjected to a stretching operation maintaining an optimum draw ratio to get a highly stretched fibre with high mechanical strength properties. The diameter of the fibre reduces on stretching. The fibre specification after stretching is given below. This form of fibre is used for RF heating.

Fibre diameter (core+sheath) after stretching: Stretched:
 ~30 μm
 Core diameter: ~22-26 μm
 Sheath thickness: ~2-3 μm Relative mass proportion (core:sheath 65-75:35-25); relative volume proportion (core:sheath 60-70:40-30). The core: sheath ratio may be varied depending on the application. The sheath should form a minimum of 10 wt % of the whole material.

Figure 14:
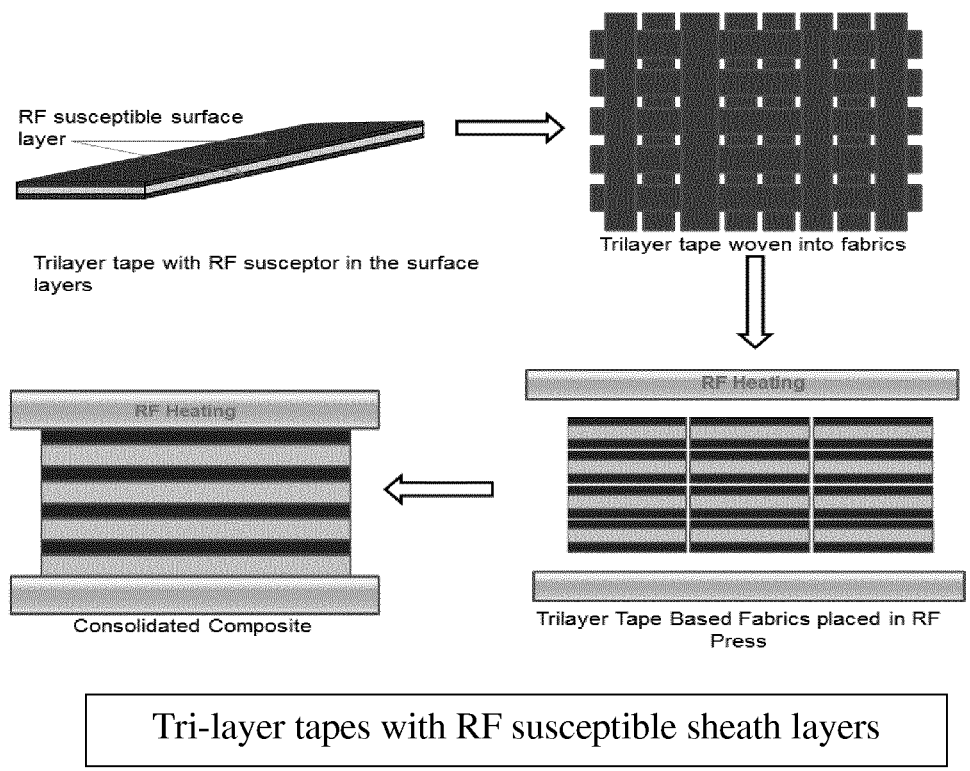
FIG. 14 is a flow diagram showing heating and pressing of a dielectric heating susceptible material in the surface layers of a tri-layer tape in a woven form.

Another suitable form can be a layered tape like material. Tri-layer coextruded tapes with RF susceptible surface layers and their consolidation in an RF field is shown schematically in FIG. 14. As an example, PET-PVDF-CB of 84-15-1 composition was selected for making a tri-layer tape where the two outer layers contain the RF susceptors. The materials used were:

Core layer: PET with intrinsic viscosity (IV) ranging from 0.65-0.80.

RF susceptible surface layers: PET with IV ranging from 0.65-0.8; PVDF (Kynar® ADX 111 grade from Arkema) and carbon black (Black Pearl® 2000 from Cabot Corporation). The composition used is given in Table 7.

TABLE 7

Composition of co-extruded tri-layer tapes

|  | PET (wt %) | PVDF (wt %) | Carbon black (wt %) |
|---|---|---|---|
| RF susceptible surface layers | 84.0 | 15.0 | 1.0 |
| Core layer | 100.0 | — | — |

Tape thickness: In stretched condition, thickness of the tape approximately 55 μm; with the core layer nearly 35 μm and the RF susceptible surface layers approximately 10 μm each on the top and the bottom surfaces of the tape. Tape width: 22 mm.

Relative mass and volume proportions between the middle layer and the surface layers:mass proportion 60:40; volume proportion 70:30.

The specification may vary based on the application process. The specification may range between 2.5-25 mm width and 65-120 μm thickness, but not limited to this.

RF Processing

RF heating energy input and time: The heating energy input and time changes for the design and thickness of the material, e.g. in this case, fifteen layers of tri-layer tape consolidated into a 2.5 mm thick laminate required 0.45 kW of RF power for 30 sec.

RF heating and joining trials were conducted with the tri-layer tapes. Fifteen layers of tapes with RF susceptible formulation were stacked in the RF oven and pressed for less than 30 sec to form a laminate.

Figure 15:
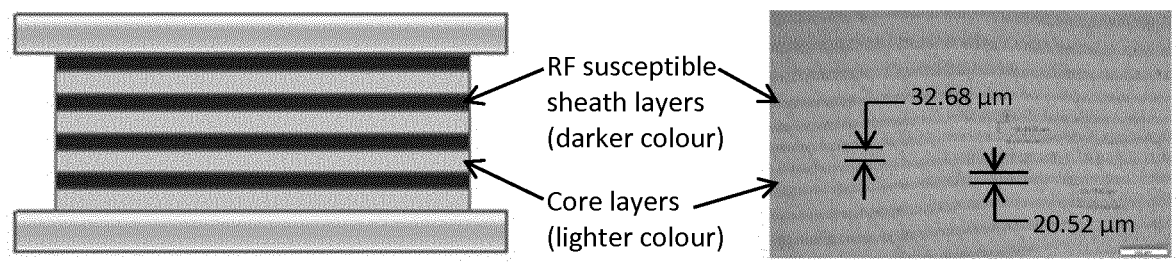
FIG. 15 shows the cross section of the tri-layer tape based laminate before and after consolidation in an RF press.

The power used was 0.45 kW and frequency used was 27.12 MHz. The RF susceptible surface layers melted and fused in 30 seconds showing that the temperatures of the surface layers increased above 248° C. (melting point of the surface layers) in 30 seconds under RF radiation, leading to the joining of the fifteen layers of tapes and formation of a consolidated laminate in 30 seconds. The cross section of the laminate consolidated in the RF press is shown in FIG. 15.

The invention is not limited to the embodiments described but may be varied in construction and detail. In addition to PET the invention is applicable to other thermoplastics such as PE, PP, PA, PEEK, PEI, PS, PMMA or blends thereof as well as thermosetting resin materials and thermoplastic:thermoset blends.

Microwave Heating Trial

A microwave heating trial of the formulated PET compounds was conducted using a CEM Discover SP microwave synthesiser. In this particular trial, the microwave frequency was 2.45 GHz.

TABLE 8

Polymer blend compositions (PET-PVDF-CB) designed to develop MW susceptible formulation

| Base polymer PET (wt %) | MW Susceptor | |
|---|---|---|
| | PVDF (wt %) | Carbon black (wt %) |
| 100 | 0 | 0 |
| 85 | 15 | 0 |
| 84 | 15 | 1 |
| 82 | 15 | 3 |
| 70 | 30 | 0 |

Figure 16:
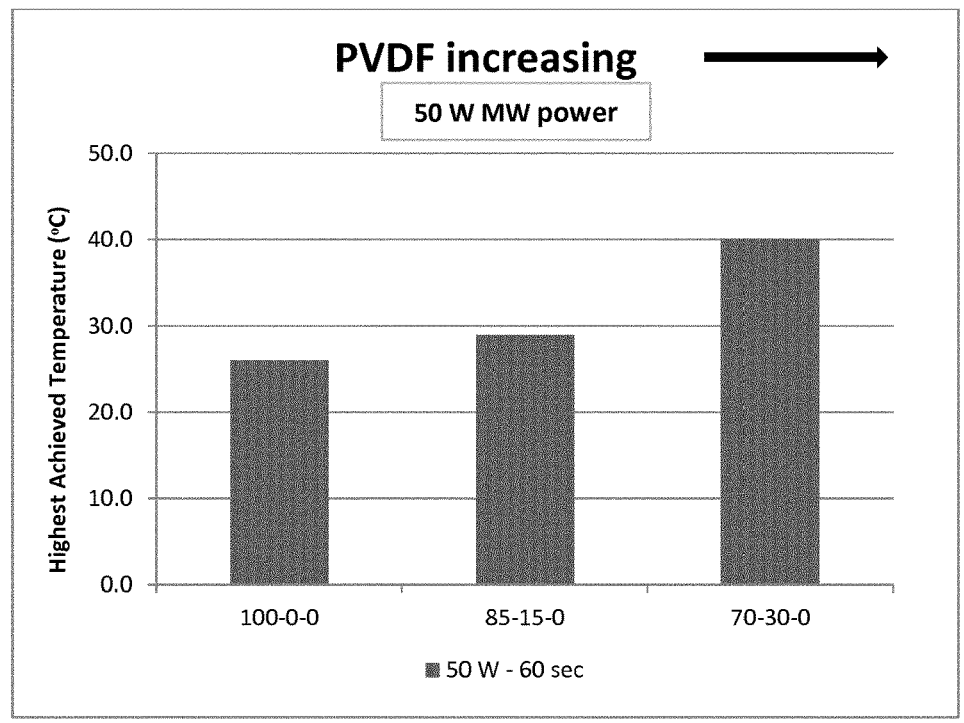
FIGS. 16, 17 and 18 show the results of microwave heating trials.

FIG. 16 shows the effect of PVDF on MW heating of PET. The results for highest temperature achieved by each polymer blend composition show that increasing PVDF content in PET base polymer increases the heating effect under MW irradiation.

Figure 17:
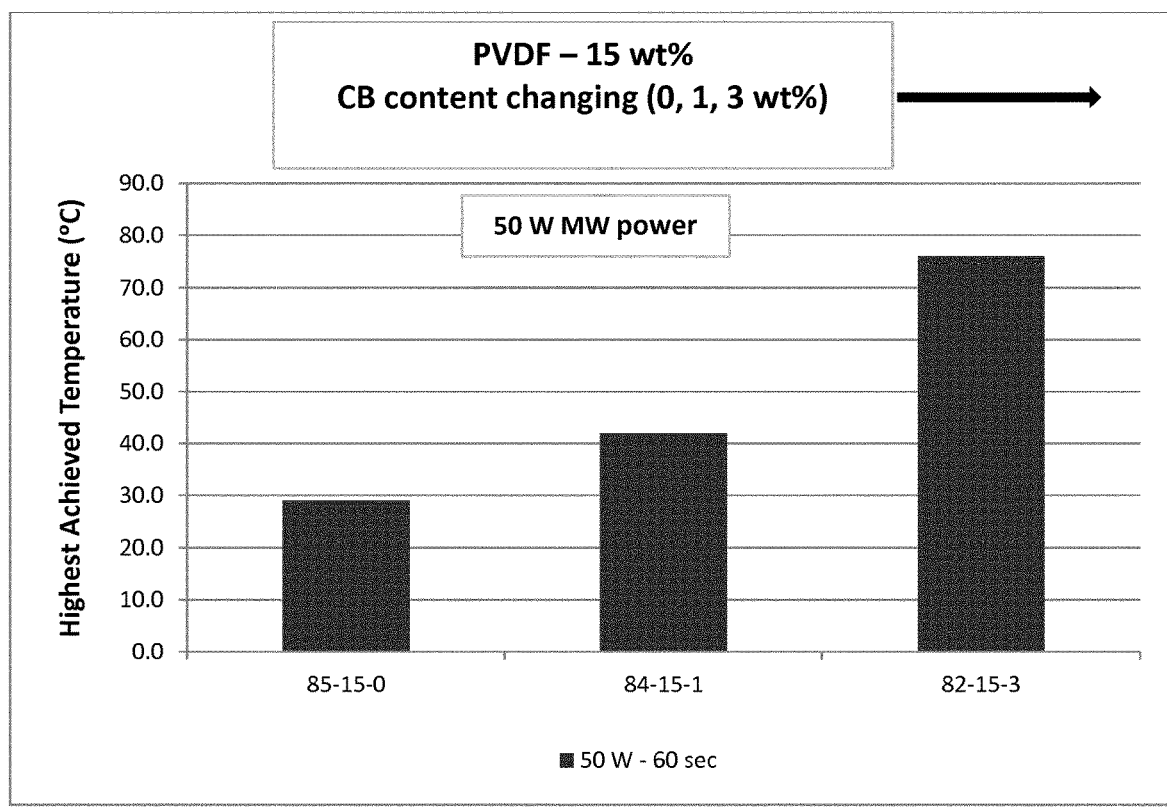

FIG. 17 shows the effect of increasing CB content on the MW heating of PET based blend. The presence of CB in addition to PVDF in the PET base polymer significantly enhances the heating effect under MW irradiation.

Figure 18:
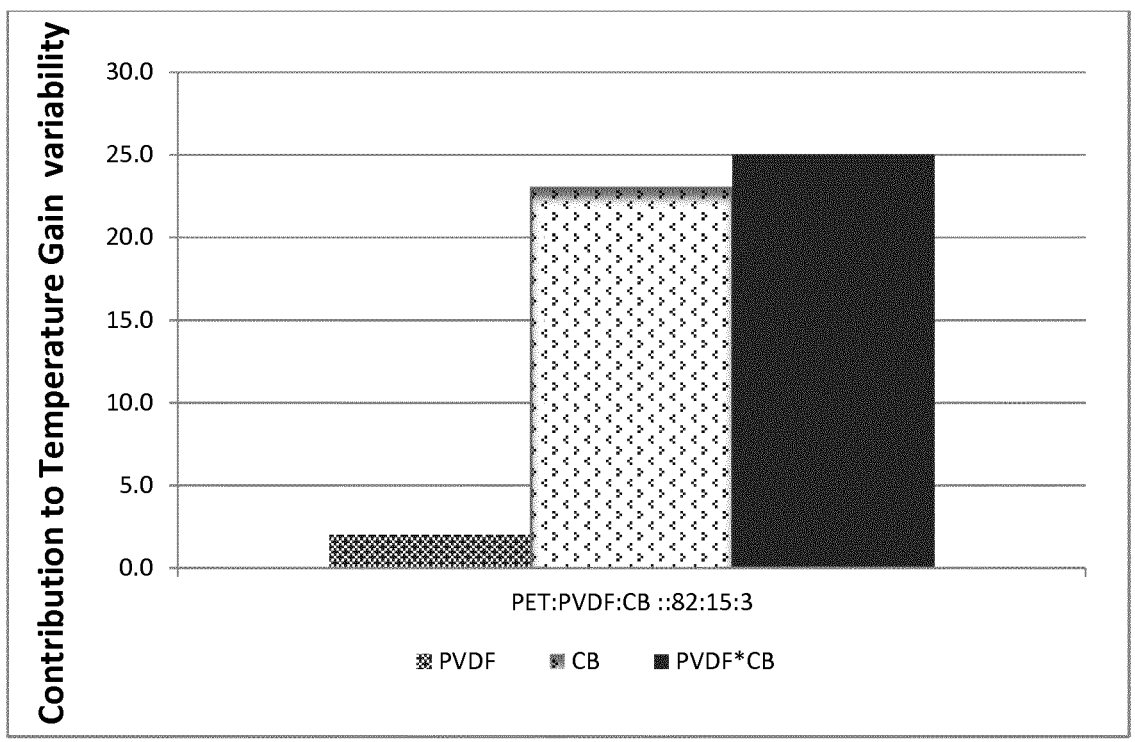

Design of Experiments (DoE) was also employed to gather information on the interactions between the PVDF and CB content in the compositions and how these interactions influenced the variation in the output measure (temperature rise in the MW field). FIG. 18 shows the contribution to temperature gain variability in 50 W power MW irradiation for 60 sec (PET:PVDF:CB::82:15:3). The Figure shows the contribution of the individual and combined interactions in raising the temperature of the material under MW field. The variables along the X axes of this plot is the amounts of PVDF and CB used in the formulation, either taken individually or in combination. The Y axes represent the contribution of the components, individually or in combination, to the temperature gain variability of the material in the MW field. CB is found to have a more dominating influence on the heating of the material under MW field, but PVDF-CB combination has a higher effect. This effect can be maximised with further optimisation in formulation.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A material susceptible to dielectric heating by electromagnetic radiation, the material comprising:
a base polymeric material (1) including electrically polarisable entities (3) dispersed within, and
a dielectric heating susceptor comprising:
polymeric material (2) different from the base polymeric material and having a higher dielectric loss factor than the base polymeric material,
wherein the dielectric heating susceptor polymeric material (2) is present in the form of discrete phases dispersed in the base polymeric material (1), forming a multiple phase morphology,
wherein the electrically polarisable entities (3) are present in a proportion of 0.5 to 5 wt % of the material, and
wherein the electrically polarisable entities (3) are of conductive material having interfacial polarisation loss properties.

2. The material as claimed in claim 1, wherein the dielectric heating susceptor polymeric material is present in a proportion of 1 to 30 wt % of the material.

3. The material as claimed in claim 1, wherein the dielectric heating susceptor polymeric material is a polar polymer.

4. The material as claimed in claim 1, wherein the base polymeric material is selected from the group consisting of: polyethylene terephthalate (PET), polyethylene (PE), polypropylene (PP), polyamides (PA), polyetheretherketone (PEEK), polyphenylene sulphide (PPS), polyetherimide (PEI), polystyrene (PS), acrylonitrile/butadiene/styrene (ABS), polyacrylates (e.g. PMMA), polyacrylonitrile (PAN), polycarbonate (PC), epoxies, vinyl esters, unsaturated polyesters, phenolics, cyanate esters, bismaleimides, polyimides, and blends/mixtures thereof; and the dielectric heating susceptor polymeric material is a polar polymer comprising one or a combination of the following: PVDF, PU, PAI, PA, cellulose esters, PVC, acrylics, or PVC/acrylic alloy.

5. The material as claimed in claim 1, wherein the base polymeric material includes PET and the dielectric heating susceptor polymer material is a polar polymer comprising one or a combination of PVDF, PU, and PAI.

6. The material as claimed in claim 1, wherein the electrically polarisable entities are present in the form of discrete entities, not forming a conductive network.

7. The material as claimed in claim 1, wherein the size of the electrically polarisable entities is in the range of 10 nm to 100 µm.

8. The material as claimed in claim 1, wherein the electrically polarisable entities comprise carbon black.

9. The material as claimed in claim 1, wherein the base polymeric material is modified with an elastomer.

10. The material as claimed in claim 1, further comprising a filler material, said filler material comprising particles and/or platelets and/or tubes and/or fibres to provide a composite material.

11. A process for heating a material of claim 1, the process comprising irradiating the material with electromagnetic radiation.

12. The process as claimed in claim 11, wherein the electromagnetic radiation has a frequency in the range of 10 MHz to 30 MHz.

13. The process as claimed in claim 11, wherein the electromagnetic radiation has a frequency in the range of 900 MHz to 2.45 GHz.

14. The material as claimed in claim 1, wherein the dielectric heating susceptor polymeric material is present in a proportion of 5 to 25 wt % of the material.

15. The process as claimed in claim 11, wherein the electromagnetic radiation has a frequency in the range of 13.54 MHz to 27.12 MHz.

* * * * *